United States Patent
Bosma et al.

(10) Patent No.: US 6,802,375 B2
(45) Date of Patent: Oct. 12, 2004

(54) METHOD FOR PLUGGING A WELL WITH A RESIN

(75) Inventors: Martin Gerard Rene Bosma, GD Rijswijk (NL); Erik Kerst Cornelissen, GD Rijswijk (NL); Alexander Schwing, GD Rijswijk (NL)

(73) Assignee: Shell Oil Company, Houston, TX (US)

( * ) Notice: Subject to any disclaimer, the term of this patent is extended or adjusted under 35 U.S.C. 154(b) by 10 days.

(21) Appl. No.: 10/296,308

(22) PCT Filed: May 21, 2001

(86) PCT No.: PCT/EP01/05854

§ 371 (c)(1),
(2), (4) Date: Nov. 21, 2002

(87) PCT Pub. No.: WO01/90531

PCT Pub. Date: Nov. 29, 2001

(65) Prior Publication Data

US 2003/0121662 A1 Jul. 3, 2003

(30) Foreign Application Priority Data

May 22, 2000 (EP) ............................................ 00304289

(51) Int. Cl.⁷ ............................................. E21B 33/13
(52) U.S. Cl. ..................... 166/295; 166/64; 166/250.14; 166/277
(58) Field of Search ........................... 166/295, 250.01, 166/250.14, 64, 66, 285, 292, 277, 192

(56) References Cited

U.S. PATENT DOCUMENTS

| | | |
|---|---|---|
| 3,170,516 A | 2/1965 | Holland et al. |
| 3,312,296 A | 4/1967 | Paramore et al. |
| 3,933,204 A | 1/1976 | Knapp ........................ 166/295 |
| 3,960,801 A | 6/1976 | Cole et al. |
| 4,216,829 A | 8/1980 | Murphey ..................... 166/276 |

(List continued on next page.)

FOREIGN PATENT DOCUMENTS

| | | | |
|---|---|---|---|
| CA | 1247352 | 12/1988 | ......... E21B/33/138 |
| CA | 1324753 | 11/1993 | ........... E21B/33/14 |
| EP | 0 325 541 | 12/1992 | ......... E21B/33/134 |
| EP | 0 899 417 A1 | 3/1999 | ......... E21B/33/138 |
| SU | 1728473 | 4/1992 | ......... E21B/33/138 |
| WO | 94 21886 | 9/1994 | ......... E21B/33/138 |
| WO | 99 43923 | 9/1999 | ........... E21B/33/13 |
| WO | 00 61914 | 10/2000 | ........... E21B/43/10 |

OTHER PUBLICATIONS

R. Ng et al. "Phenolic/Epoxy Resins for Water/Gas Profile Modification and Casing Leak Repair", Paper ADSPE #90, presented at the ADIPEC, held in Abu Dhabi Oct. (16–19), 1994.

W.V.C. de Landro et al., "Case History: Water Shut–Off using Plastic Resin in a High Rate Gravel Pack Well"— Paper SPE 36125 presented at the 4$^{th}$ Latin American Caribbean Petroleum Engineering Conference, Spain Apr. 23–26, 1996.

(List continued on next page.)

*Primary Examiner*—Zakiya Walker

(57) ABSTRACT

A method for carrying out well construction, repair and abandonment operations, the method involves introducing a resin into a well and curing the same to form a seal, plug or connection, wherein the cured resin is expanded to at least the volume occupied by the resin prior to curing (compensating shrinkage), by cooling the well and curing the resin at a reduced temperature and subsequently allowing the well to reach its static bottom hole temperature. A method is also disclosed for analyzing the setting time, elastic properties, shrinkage/expansion, compressibility or coefficient of thermal expansion of thermosetting resins or oil well cements under simulated reservoir pressure and temperature conditions, which involves introducing a sample of a thermosetting resin or oil well cement into a pressure vessel that is equipped to provide the pressure and register the volume change to the analyzer used by this method.

16 Claims, 2 Drawing Sheets

U.S. PATENT DOCUMENTS

| | | |
|---|---|---|
| 4,537,918 A | 8/1985 | Parcevaux et al. |
| 4,797,159 A | 1/1989 | Spangle |
| 4,898,242 A | 2/1990 | Jennings, Jr. et al. |
| 4,921,047 A | 5/1990 | Summers et al. |
| 5,159,980 A | 11/1992 | Onan et al. |
| 5,215,147 A | 6/1993 | Grego et al. |
| 5,293,938 A | 3/1994 | Onan et al. |
| 5,310,846 A | 5/1994 | Inomata et al. |
| 5,314,023 A | 5/1994 | Dartez et al. |
| 5,342,879 A | 8/1994 | Takahashi et al. |
| 5,484,020 A | 1/1996 | Cowan |
| 5,497,829 A | 3/1996 | Rajkovich .................. 166/285 |
| 5,712,314 A | 1/1998 | Surles et al. |
| 5,738,463 A | 4/1998 | Onan |
| 5,875,844 A | 3/1999 | Chatterji et al. |
| 5,875,845 A | 3/1999 | Chatterji et al. |
| 5,969,006 A | 10/1999 | Onan et al. |
| 6,006,834 A | 12/1999 | Skinner |
| 6,012,524 A | 1/2000 | Chatterji et al. |

OTHER PUBLICATIONS

Finite Element Modeling (FEM), as described by Bosma, Ravi et al. may be used (SPE56536, "Design Approach to Sealant Section for the Life of the Well", presented at the 1999 SPE Annual Technical Conference and Exhibition, held in Houston, TX, Oct. 3–6, 19999.

Theircelin et al. (SPE 38598, "Cement Design based on Cement Mechanical Response", SPE Drilling & Completion, Dec. 1998, pp. 266–273).

Bosma et al. in "Cementing: How to Achieve Zonal Isolation", as presented at the 1997 Offshore Mediterranean Conference, held in Ravenna, Italy.

SPE 1376 presented by P.A. Parceveaux and P.H. Sault at the 59th Annual Technical Conference and Exhibition in Houston, Texas (Sep. 16–19, 1984) entitled "Cement Shrinkage and Elasticity: A New Approach for a Good Zonal Isolation".

METHOD FOR PLUGGING A WELL WITH A RESIN

FIELD OF THE INVENTION

This invention relates to a method for carrying out well construction, repair and abandonment operations with a thermosetting resin as seal, plug or connection. More in particular, this invention relates to a method of improving the gas tightness of sealing materials in primary cementing, well repair and plugging operations in oil/gas wells.

This invention also relates to an analyzer for determining the setting time, elastic properties, shrinkage/expansion, compressibility and coefficient of thermal expansion of thermosetting resins and oil well cements under simulated reservoir pressure and temperature conditions.

BACKGROUND OF THE INVENTION

The main objectives for drilling an oil or gas well are to create a connection to an oil and/or gas reservoir and to install a conduit (called production tubing) between the reservoir and the surface. The outer steel protection of a well is called the casing. The casing requires a gas tight seal between the reservoir and the surface. To achieve such seal, the annulus (the gap between the casing and the rock/ formation) is subjected to a cementing (or grouting) operation. This treatment is normally referred to as Primary Cementing. The main aspects of primary cementing are to isolate flow between different reservoirs, to withstand the external and internal pressures acting upon the well by offering structural reinforcement and to prevent corrosion of the steel casing by chemically aggressive reservoir fluids.

A poor cementing job can result in migration of reservoir fluids, even leading to gas migration through micro-annuli in the well which not only reduces the cost-effectiveness of the well but may cause a "blow out" resulting in considerable damage. Repair jobs ("secondary cementing") are possible (in essence forcing more cement into the cracks and micro-annuli). However, they are costly and do not always lead to the desired results.

When a well has reached the end of its economical life, the well needs to be abandoned in compliance with local regulations. Abandonment is usually carried out by first plugging each of the casings in a large number of sequential steps, cutting and removing these cut steel casing stubs and successively placing large cement plugs in order to permanently seal the well. As only relatively small volumes of cement (typically in the order of 100 m) are used for those plugs, their quality needs to be excellent as they will have to act as a seal for a very long time.

One of the major drawbacks of using traditional cementing materials such as 'OPC' Class G Oil Well Cement ('OPC'=Ordinary Portland Cement) in plugging operations is that this widely employed material cannot achieve a gas tight seal due to its inherent shrinkage. The total chemical contraction can be split between a bulk or external volume shrinkage (less than 1%), and a matrix internal contraction representing 4–6% by volume of the cement slurry, depending upon the cement composition (Parcevault, P. A. and Sault, P. H. 'Cement Shrinkage and Elasticity: A new Approach for good zonal Isolation', paper SPE 13176 (1984). The combined shrinkage phenomena cause gas migration through micro-annuli and cracks. These are created because of those shrinkage phenomena and the inherently poor adhesion of Oil Well cement to the steel Casing. The already poor adhesion is even further deteriorated by the inability to properly clean the surface of the steel casing prior to cementing.

The use of conventional cementing materials in "remedial secondary cementing" has the disadvantage that the customary grain size is too large to pass freely into the micro-annuli and cracks which affect the quality of the seal.

In the search for effective cementing materials, attention has to be paid to inter alia the following requirements: the material should be gas-tight (i.e. withstand at least 2 bar per m), it should have a controllable setting time so that a range of temperatures and well depths (each requiring different conditions) can be coped with, it should be thermally stable up to 250° C. as well as being chemically stable against reservoir fluids for a very long period of time and its rheological properties should be such that pumping through existing oil field equipment can be carried out without too much problems.

A wide range of non cementious sealants have been suggested to cope with at least part of the problems outlined herein above. Examples of such materials are resins (R. Ng and C. H. Phelps: "Phenolic/Epoxy Resins for water/Gas Profile Modification and Casing Leak Repair" Paper ADSPE #90, presented at the ADIPEC, held in Abu Dhabi (16–19) October 1994); phenol-or melamine formaldehyde (W. V. C. de Landro and D. Attong: "Case History: Water Shut-off using Plastic Resin in a High Rate Gravel pack Well"— Paper SPE 36125 presented at the 4th Latin American and Caribbean Petroleum Engineering Conference, held at Port of Spain in Trinidad, 23–26 Apr. 1996); and polyacrylates (U.S. Pat. No. 5,484,020 assigned to Shell Oil).

Although such materials can be instrumental in solving some of the problems encountered with traditional, cement-based plugs, there are still important drawbacks to be reckoned with in terms of handling aspects, control of setting times and long term durability.

Also rubbers have been proposed in general for use as plugging materials. Reference is made to U.S. Pat. No. 5,293,938 (assigned to Halliburton Company) directed to the use of compositions consisting essentially of a mixture of a slurry of a hydraulic cement (such as Portland cement) and a vulcanizable rubber latex. Rubbers specifically referred to in said U.S. patent specification are natural rubbers, cis-polyisoprene rubber, nitrile-rubber, ethylene-propylene rubber, styrene butadiene rubber, butyl rubber and neoprene rubber.

The vulcanization of the rubber involves the cross-linking of the polymer chains which can be accomplished by incorporating one or more cross-linking agents (the most common one being sulphur) in the rubber latex (latex having been defined as the aqueous dispersion or emulsion of the rubber concerned).

In European patent No. 325,541 (Merip Tools International S.A) the use of putty ("mastic") has been disclosed for producing joints separating zones in wells. Suitable compounds are formed by liquid elastomers such as fluorosilicones, polysulphides, polythioethers as well as epoxy or phenolic resins. In addition, from International application WO 99/43923 a special class of room temperature vulcanizing silicone and fluorsilicone rubbers is known that can be advantageously employed in the repair and abandonment of wells.

Unfortunately, curing of non cementious plugging agents is also accompanied by shrinkage, again potentially leading to micro-annuli and cracks in the sealant and/or lack of bonding of the seal, plug or connection to its surroundings. This will especially occur if the adhesion of the thermosetting resin to the steel casing surface is less than the forces induced by the shrinkage process. It therefore remains desirable to further improve existing methods to overcome said drawbacks.

SUMMARY OF THE INVENTION

In accordance with the main embodiment of the invention there is provided a method for carrying out well construction, repair and abandonment operations, which method involves introducing a resin into a well and curing the same to form a seal, plug or connection, wherein the cured resin is expanded to at least the volume occupied by the resin prior to curing (compensating shrinkage), by cooling the well and curing the resin at a reduced temperature and subsequently allowing the well to reach its static bottom hole temperature.

The expression "resin" used in the main claim and throughout the specification refers to "classic" thermosetting resins, as well as ductile, vulcanizable rubbers.

Another embodiment of the invention comprises a method for removing a seal, plug or connection made of an expanded resin and used in well construction, repair and abandonment, comprising the steps of a) cooling the well, until the seal, plug or connection has shrunk loose, and b) removing the loose seal, plug or connection.

Finally, the invention also provides a method for analyzing the setting time, elastic properties or shrinkage/expansion of resins or cements used in well construction, repair and abandonment operations under simulated reservoir pressure and temperature conditions, and the analyzer used by that method.

DESCRIPTION OF THE INVENTION

Figure 1:
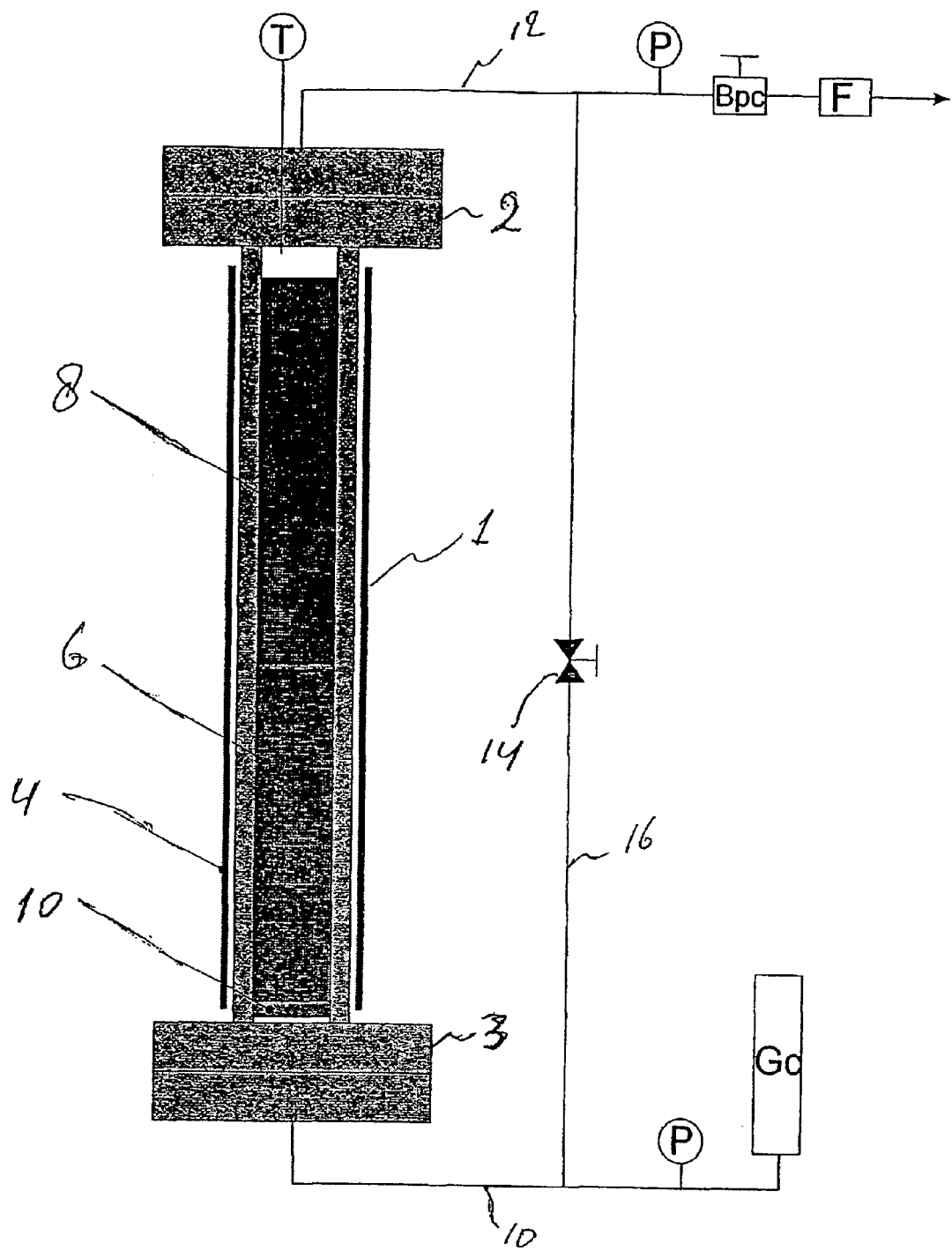
FIG. 1 is a schematic representation of a gas migration set-up.

In carrying out the process of the invention a well, preferably an oil or gas well, is cooled by a significant degree. The degree of cooling is discussed hereinafter. Next, a—preferably liquid—thermosetting resin or vulcanizable rubber is introduced and allowed to react (i.e. cure) until a solid, thermoset resin of nearly the dimensions of the surrounding "mold" is made. When the well is next allowed to reach its static bottom hole temperature, the seal, plug or connection will expand more than the well due to the greater thermal expansion coefficients of resins compared to the base materials of the well (e.g., carbon steel casing, primary cement having thermal expansions coefficients in the order of respectively 1.3*10-3 and 1.0*10-3 volume % per degree Centigrade (vol %/° C.), whereas that of resins may be e.g., 50–100× larger). The expansion should at least compensate for shrinkage, ensuring gas tightness of the well, and better even expand beyond such dimension to ensure a very firm bonding with the plug, seal or connector's environment.

Using a conventional resin, typically the well should be cooled by up to about 100° C., for instance up to about 50° C., more suitably from about 15 to about 40° C. For instance, the candidate well may be cooled by circulation or (preferably) by injection of a cold fluid. This can be achieved via a workstring during a drilling/completion operation, or the completion tubing or coiled tubing for an already completed well. Suitable fluids can be (sea) water, completion brine, hydrocarbons as e.g. diesel, condensate or (to a lesser extent) a drilling fluid.

Other methods which could be envisaged is the 'slurrying' of 'Dry Ice' (solid Carbon Dioxide) in the injection stream or cooling this stream at surface with e.g. liquid Nitrogen in a fluid/fluid heat exchanger.

The degree of cooling depends on various parameters. For instance, a practical approach for a well engineer would be to estimate the degree of cooling on the basis of well properties (e.g. static bottom hole temperature, length of the well bore, well geometry and presence of aggressive chemicals), on the basis of the properties of the material used in the well (steel, rock, cement), and on the basis of the properties of the resin (e.g. amount of shrinkage upon curing, difference in thermal expansion coefficient vis-à-vis that of the well materials; rate of curing at the lowered temperature), and on the availability of a cooling medium. As to the latter parameter; it will be obviously easier for the well engineer to cool a High Pressure/High Temperature (HPHT) well using ice cold sea water, than to cool a shallow well in a continental Mediterranean zone, where only lukewarm water is available.

The above cooling temperatures are suggested for resins with no or ordinary shrinkage upon setting and a thermal expansion coefficient 20 to 200× that of the well material. Thus, cooling by more than about 100° C. will rarely by necessary, unless a resin with exceptionally large shrinkage and/or exceptionally low thermal expansion coefficient is used.

Alternatively, and more precisely, the extent of cooling may be defined by the product of the temperature difference by which the well is cooled ($\Delta T$ in ° C.) and the difference in thermal expansion coefficient of the resin vis-à-vis that of the well material ($\Delta X$ in vol %/° C.). For instance, this product $\Delta T.\Delta X$ is suitably in the range of from about 0.5 to about 10, more suitably in the range of from about 2.0 to about 5, with the range of from about 3.0 to about 3.5 being preferred.

For even more accurate calculations as to the most suitable cooling temperature, without endangering the integrity of the well by too excessive expansion, calculations by Finite Element Modeling (FEM), as described by Bosma, Ravi et al may be used (SPE 56536, "Design Approach to Sealant Selection for the Life of the Well", presented at the 1999 SPE Annual Technical Conference and Exhibition, held in Houston, Tex., Oct. 3–6, 1999). In fact, this article describes the desirability of utilizing expanding ductile sealants, however, without any suggestion to cool the well first and use the thermal expansion of the thermoset resin to improve its bonding with e.g. the casing. Another model that may be used is described by Theircelin et al (SPE 38598, "Cement design based on Cement Mechanical Response", SPE Drilling & Completion, December 1998, pp. 266–273).

To test the accuracy of the determination and/or provide physical data on resin behaviour at well conditions, the present invention also provides a specifically designed analyzer. This third embodiment of the present invention is described in more detail in the experimental section.

Thermosetting resins have been used in wells (oil, gas, water or even waste disposal wells) before. Those having a thermal expansion coefficient significantly greater than 10-3 vol %/° C. may in principle be used, as long as shrinkage occurring during curing is compensated for. Also mixtures of resins as well as mixtures with resins and other materials (e.g. Oil Well Cements, whether Ordinary Portland, Blast Furnace Slag or Aluminate) may be used.

For instance, U.S. Pat. No. 3,170,516 describes the recompletion of wells, particularly oil and gas wells, wherein the bore of a well pipe is plugged with a liquid mixture of a thermosetting phenolic condensation resin and a catalytic hardener thereof. Epoxy resin compositions that are curable to hard impermeable solids for use in well bores have also been described in U.S. Pat. Nos. 3,960,801; 4,921,047; 5,314,023; 5,547,027; 5,875,844; 5,875,845; 5,969,006; 6,006,834 and 6,012,524, the contents of which are incorporated herein by reference; in International application WO 94/21886, and in European patent application No. 899,417. Most of these epoxy resins are base on diglycidyl ethers of bisphenols, Bisphenol-A and Bisphenol-F in particular, and such epoxy resins, if an epoxy resin is used, are preferred.

Other thermosetting resins that have been used in well bore applications, include ureum, phenol and melamine formaldehyde resins (Derwent abstracts 93-124473/15; 94-016587/03 and 89-032494/05); latex compositions (U.S. Pat. Nos. 3,312,296; 4,537,918; 5,159,980; 5,738,463, the contents of which are incorporated herein by reference, and Derwent abstract 98-51909/44); the room temperature vulcanizing silicone and fluorsilicone compounds mentioned before; other resins such as disclosed in U.S. Pat. Nos. 4,898,242 and 5,712,314, the contents of which are incorporated herein by reference, and novel perfluoroether silicone hybrids (as disclosed in U.S. Pat. Nos. 5,310,846 and 5,342,879, the contents of which are incorporated herein by reference) which are marketed by Shin Etsu, Fremont, USA under the trade name SIFEL.

Suitable thermosetting resins may be selected on the basis of the thermal expansion coefficient of the resulting thermoset resin, and its reaction (setting) rate. Thus, suitable thermosetting resins are those resulting in a thermoset resin preferably having a thermal expansion coefficient that is greater than about 0.0015 vol %/° C., more preferably is in the range of from about 0.02 to about 0.20 vol %/° C. (as measured by the apparatus disclosed as the third embodiment of this application). Besides, the thermoset resin should set sufficiently quickly to benefit from the thermal expansion coefficient when the well temperature increases, e.g. it should react fully in the order of hours compared with the tens of hours required to allow the well to regain its initial (bottom hole static) temperature. Furthermore, suitable resins should be impervious to gas, oil, brines and well-treating chemicals at well operating temperatures and pressures.

Particularly suitable resins for use in the methods of the present invention are elastomeric thermoset resins. For instance, the vulcanizable rubbers of U.S. Pat. No. 5,293,938; European patent application No. 325,541 and/or international application WO 99/43923, all incorporated by reference, may be used.

With respect to the thermosetting resins mentioned before and in the section on the background of the invention those of WO 99/43923 are particularly preferred. These RTV silicone rubbers include the condensation products of silanol terminated polymers with a cross-linking agent, as well as the addition/curing (fluor)silicone compositions described therein.

Good results in accordance with the present invention can be obtained when using a two component Room Temperature Vulcanizing (RTV) silicone rubber or fluor-containing RTV silicone rubber. Such two component systems comprise two base chemicals: a hydride functional silicone cross linking agent and a vinyl functional silicone polymer. When these base compounds are brought into contact they will react, presumably via the addition-curing principle as discussed herein before, thereby producing a (fluor)silicone rubber or gel type material. One of the advantages of this curing system is that it does not require an external reagent to initiate reaction (like water, e.g. present in moist air). A further advantage of this curing system is that it does not produce unwanted or damaging by products like alcohols or acetic acid. It is also not limited by diffusion of one of the reactants (e.g. moist air) into the other very viscous component. Therefore, the reaction of the two components will proceed independently of their respective volumes.

International application No. WO 99/43923 describes RTV (fluor)silicone rubbers for: (1) zonal isolation, a) as an alternative to primary cementing in conventional well completion applications, or b) in combination with Expandable Tubing (cf. PCT/EP00/03039); (2) as well repair method for corroded tubing, and (3) to fill External Casing Packers. It should be realized that the method of the present invention can be used in a similar fashion.

As such, the thermosetting agent is placed in the well, at a desired depth and location (e.g. in the annulus during a primary cementation or as a plug, in a "plug and abandonment" operation). Prior to placement, the well will have been cooled by one of the methods described in the preceding text.

Due to the (significantly) higher thermal expansion of the thermoset resin (e.g., the RTV (fluor)silicone rubbers described in WO 99/43923 expand by some 0.06–0.08 vol %/° C.), the resin will expand more than the rest of the completion upon re-heating of the well, which 1) will more than compensate for any shrinkage incurred during the setting of the resin (typically some 0.6% upon setting from the liquid to the solid phase) and 2) will improve the chemical and/or physical adhesion process of the resin to the casing wall.

The seal may be further improved by enclosing it between a cement pre-flush and after-flush. To enable the placement of such a cement-resin-cement sandwich in a Plug and Abandonment (P & A) application, the cement pre-flush preferably has a higher density than the thermosetting resin which may be achieved by the addition of conventional weighting agents such as barite, hematite, trimagnesium tetroxide, and the like.

Similarly, the cement after-flush preferably has a lower density than the thermosetting resin, e.g. by the addition of extenders e.g. lightweight fillers, hollow microbeads and the like.

According to another embodiment, which is basically an extension of the embodiment described herein before, the invention also provides a method for removing a seal made of a thermoset, expanded resin, by cooling the well wherein the seal is used until the seal has sufficiently shrunk to allow its (non-destructive) removal.

Whilst the above process has been described in combination with well technology applications, it should be realized that the invention is not so limited. Indeed, the process of the present invention may also be applied in surface facilities (e.g. temporary or permanent plugging of pipelines and/or risers during e.g. platform (de)commissioning activities, and abandonment of pipelines and the like).

The specific formulations can for instance be tested in the large-scale gas migration rig which has been described by Bosma et al in "Cementing: How to achieve Zonal Isolation" as presented at the 1997 Offshore Mediterranean Conference, held in Ravenna, Italy). The equipment comprises in essence a 4 meter high, 17.8×12.7 cm (7×5 inch) steel annular casing lay-out plus a 50 cm high simulated permeable (3000 mD) reservoir. The equipment can be operated at pressures up to 6 barg and 80° C. The breakthrough of gas in the evaluation of the dynamic gas sealing ability of a candidate sealing agent (e.g. cement or another material) during setting is monitored by flow transducers and, in addition, pressure and temperature transducers placed equidistantly across the height of the column. A typical experiment is performed by applying and maintaining a well-defined overbalance between cement column and "reservoir" pressure and monitoring the dependent parameters (flow, pressures and temperatures) versus time.

It is also possible to use a static type of test equipment, e.g. as described in the paper SPE 1376 presented by P. A. Parceveaux and P. H. Sault at the 59th Annual Technical Conference and Exhibition in Houston, Texas (Sep. 16–19, 1984) entitled "Cement Shrinkage and Elasticity: A New Approach for a Good Zonal Isolation". The test equipment is in essence a high pressure static gas migration apparatus which can be operated up to 200 barg and 150° C. and comprises a cylinder in which appropriate internals such as plugs or annular casing configurations can be simulated. Typically a cement (or other material) is allowed to set inside the cylinder at static conditions (i.e. no delta P). The sealant is either present as single phase of a resin, a hybrid (e.g. a mixture of rubber latex compositions or RTV (fluor) silicone rubbers with Oil Well Cements, either Ordinary Portland Cement, Blast Furnace Slag, or Aluminate) or a sandwich of a thermoset rubber with a conventional Oil Well Cement (either Ordinary Portland Cement, Blast Furnace Slag, or Aluminate) on top of it (seen in the direction of the gas flow. The resins are placed in this cell at a certain temperature (typically reflecting that of the cooled down well) and downhole pressure and allowed to set, whilst concurrently the cell is heated further to the final Bottom Hole Static Temperature (BHST) of the well (time frame approximately one half to one day). Subsequently, the possible onset of gas leakage is monitored by applying increasing pressure differentials across the plug or annular casing configuration, by decreasing the back pressure at the top of the plug. To calibrate the test equipment default cement formulations can be used.

The present invention also provides a method of analyzing the setting time, elastic properties, shrinkage/expansion, compressibility or coefficient of thermal expansion of thermosetting resins or oil well cements under simulated reservoir pressure and temperature conditions, which comprises:

introducing a sample of a thermosetting resin or oil well cement into a pressure vessel that is equipped with a means to provide the pressure and register the volume change, and that can accurately mimic realistic oil field conditions;

at least partly immersing a body in the sample;

filling the remaining volume of the vessel;

exciting the body by an external outside force; and monitoring the progress of the setting reaction on a continuous basis by a frequency (vibration) measurement, which encompasses the determination of the changing Resonance Frequency of the body that is at least partly immersed in the sample and which is excited by an external outside force.

The vessel may, for instance, be filled with a fluid that is either hydrophilic or hydrophobic, depending on the nature of the sample to be investigated.

The means to provide the pressure and to register the volume change may be a pump or the like. For instance, excellent results have been obtained using a syringe pump that is capable of maintaining constant pressure by moving a piston.

The body may be a flat spring, that is moving in the lateral direction. Alternatively, it may be a small cylinder, plate or the like moving in the axial direction.

The body is preferably moved by an external magnetic field, but it may also be operated mechanically or similar fashion.

The present invention also provides an analyzer for determining the setting time, elastic properties, shrinkage/expansion, compressibility or coefficient of thermal expansion of thermosetting resins or oil well cements by the methods described above.

Preferably, the analyzer is equipped with a flat spring that is excited by an external magnetic field, a syringe pump, and a non magnetic pressure vessel. The most preferred analyzer is described in the experimental section.

The invention will now be illustrated by the following, non limiting Examples.

Test Equipment, the Large-Scale Migration Set-Up of FIG. 1

In FIG. 1 is shown a test set-up including a cylindrical pressure vessel 1 provided with opposite end plates 2, 3, and an electrical heater 4 is arranged around the vessel 1.

A plug composed of a thermosetting resin part 6 and a cement part 8, is arranged in the pressure vessel 1. A filter layer 10 is arranged in the pressure vessel 1, between the first resin part 6 and the lower end plate 3. A temperature sensor T is arranged in the pressure vessel 1, between the cement part 8 and the end plate 2. A gas container Gc is in fluid communication with the interior of the pressure vessel 1 at the lower end thereof via a hydraulic line 10, and a back pressure controller Bpc is in fluid communication with the interior of the pressure vessel 1 at the upper end thereof via a hydraulic line 12. Hydraulic line 12 is provided with a flow indicator F, and pressure gauges P are provided at the respective hydraulic lines 10, 12. A controllable valve 14 is provided in a third hydraulic line 16 interconnecting hydraulic lines 10, 12. The test set-up had a diameter of 14 cm and a length of 115 cm.

EXAMPLE 1

A series of experiments were conducted with the large-scale migration set-up as described above. As thermosetting resin an RTV silicon rubber (based on DC 3-4230 from the Dow Corning Corporation, Midland, USA, and formulated to have a density of 2.33 g/cc, using silica flour and Microfine Steel (100 Micron e.g. A-100 S ex Höganäs AB, Höganäs, Sweden) was selected, having a setting time of 6 hours at 100° C. A cement with a density of 1.92 g/cc and a setting time of 5 hours at 100° C. was placed on top of the resin. The simulated seal measured about 0.5 m of resin and 0.5 m of cement.

The vessel 1 was closed and pressurized up to 200 barg by means of the gas pressure provided by the gas container GC. Whilst the resin and cement were setting, the set-up was heated within a time frame of half a day from 100° C. to 130° C., the simulated BHST of the well, to induce expansion of the resin. Next, the pressure drop across the plug was increased in steps of about 10 bar up to 200 bar by successively decreasing the back pressure at the top of the plug by means of the back pressure controller BPC in order to determine the sealing capacity of the plug. The resin/cement sandwich appeared to be fully gas tight up to 200 bar differential pressure, which was the limit of the test.

The experiment was repeated with the set-up in a slanted position, simulating a well with a 50° inclination vis-à-vis a vertical well. Again the seal withstood successfully the full 200 bar pressure differential.

COMPARATIVE EXAMPLE 1

The aforementioned experiments were repeated, however, with a curing temperature of 130° C. instead of 100° C. and using a similar sandwich consisting of RTV Silicone Rubber and Class G Oil Well cement. This comparative experiment simulates the abandoning of an oil/gas well without pre-cooling. The sealing capacity of the plug was only 30 bar, using a vertical set-up.

The experimental results show the gas tightness obtained when pre-cooling a simulated oil/gas well by using a standard cement and an addition-curing silicone formulation, in particular when applying such formulations in sandwich type plugs.

Test Equipment, Analyzer at Down Hole T and P Conditions

Figure 2:
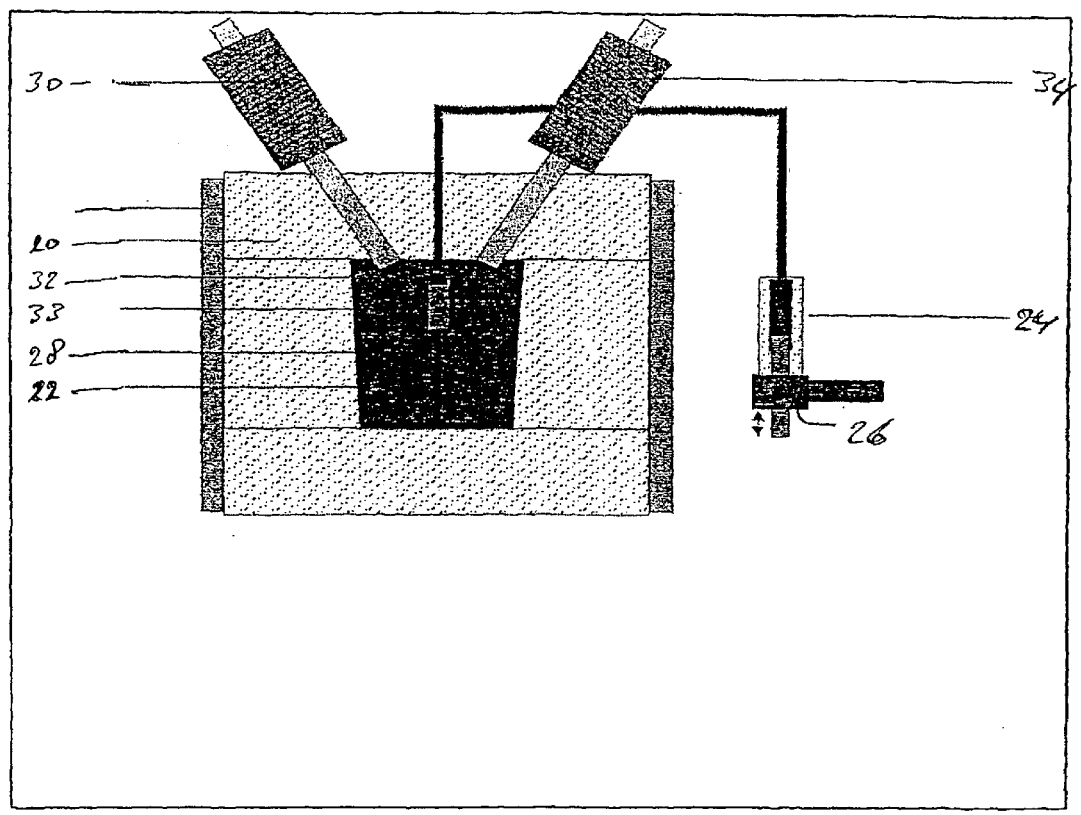
FIG. 2 is a schematic representation of a Rubber Augmentation Tester (LAB RAT).

To determine the setting behaviour, elastic/viscosity properties and volume changes of the sealant materials (resin and cement) an analyzer was developed as hereinafter described. A schematic representation of the analyzer is shown in FIG. 2.

This analyzer comprises a pressure vessel 20 to hold the sample 22, and a syringe pump 24 to provide the pressure and register the volume change.

Pressure vessel 20 is a non magnetic (e.g. INCONEL) (INCONEL is a trademark) High Pressure, High Temperature Pressure vessel, which can accurately mimic realistic oil field conditions.

The remaining volume of the vessel is occupied by a 'pressurization liquid' that may be either hydrophilic or hydrophobic, depending on the nature of the reacting system to be investigated.

Pump 24 is capable of maintaining constant pressure by moving a piston 26.

The progress of the setting reaction is monitored on a continuous basis by a frequency (vibration) measurement. It encompasses the determination of the changing Resonance Frequency of a flat spring 28 which is excited by an external Magnetic Field generated by a driving coil 30 (the frequency being continuously swept over a frequency range of some 10–70 Hz). The spring is partly immersed by the resin/cement system to be tested and as such its resonance frequency will increase as the medium (in which it is immersed) will gradually 'harden'.

The system can be either volume or pressure controlled, reflecting an isobaric or isochoric operational mode.

In a typical experiment, a continuous frequency sweep (ranging from 10 Hz to 70 Hz) is applied by means of the driving coil 30 onto the flat spring 28 which is fixed at the vessel bottom at one end and which is fully free at the other end. A tiny permanent magnet 32 is mounted at the spring 28 by a magnet holder 33 for excitation of the spring, due its interaction with the continuously changing external magnetic field of the driving coil 30.

The input magnetic energy, which will result into an oscillation of the spring is fed into the pressure vessel by a highly magnetically conductive pole shoe (not shown). The changing resonance frequency response of the spring due to the change of the viscosity of the thermosetting resin or the oil well cement, is detected by a second electromagnetic coil 34 (externally mounted on a second pole shoe). The output signal is then electronically conditioned prior to further processing.

The amplitude of the spring and its continuous change of resonance frequency is fully automatically recorded by a Data Acquisition system (hosted by a portable PC).

The damping characteristics of the spring system (being related to the viscosity of the resin/cement and the 'Spring Constant' (being related to the elasticity of the liquid or solid) can be determined by an internal algorithm.

As such not only a very clear monitoring of the onset of gelling/setting of oil well cements (and a multitude of resins and self vulcanizing rubbers) can be determined at in-situ well conditions, but also more fundamental data (elasticity modulus, viscosity), which can be used for well engineering design.

The analyzer may also be used to determine the volume changes (at isobaric conditions) or alternatively the pressure changes (at isochoric conditions), whilst allowing the candidate cement or resin to set. Both measurements can be performed at either isothermal conditions or for prescribed temperature sweeps over time.

In this manner, the volumetric properties (shrinkage or expansion) of resins or oil well cements can be determined, or alternatively their compressibility behaviour (in a time range from the onset of gelling up to far beyond 'final set' of the resin/cement) can be measured.

Also, the apparatus is capable to determine the volume change of the materials under investigation as a function of temperature (i.e. the volumetric thermal expansion coefficient, at isobaric conditions), by sweeping the temperature inside the vessel over a certain time period (max delta T of the prototype is about 270° C., i.e. −20° C. to +250° C.), whilst maintaining the applied pressure. (The maximum operating pressure of the prototype is 1500 barg).

The latter (volume change) features can be de-coupled from the frequency exciter set up (i.e. determination of the resonance-frequency), described earlier, and constructed as a separate apparatus.

EXAMPLE 2

The analyzer was used to measure the thermal expansion coefficient of the aforementioned RTV Silicone rubber, DC 3-4230 (ex Dow Corning, Midland, USA), being about 0.066 vol % per ° C. (at 200 barg), and to measure the volume change of the resin during setting (at 100° C., and 200 barg), being about −0.5 vol %.

By comparison, a conventional Class G Oil Well Cement with a Water to cement ratio of 0.40, showed a total shrinkage of some 4–5% (at 100° C., and 200 barg), after final setting and a thermal expansion coefficient of 0.001 vol % per ° C. (at 200 barg).

What is claimed is:

1. A method for carrying out well construction, repair and abandonment operations, which method involves introducing a resin into a well and curing the same to form a seal, plug or connection, wherein the cured resin is expanded to at least the volume occupied by the resin prior to curing, wherein the curing and expanding are done by cooling the well and curing the resin at a reduced temperature and subsequently allowing the well to reach its static bottom hole temperature.

2. The method of claim 1, wherein the well is cooled by up to about 100° C.

3. The method of claim 1, wherein the extent of cooling is defined by the product of the temperature difference by which the well is cooled ($\Delta T$ in ° C.) and the difference in thermal expansion coefficient of the resin vis-à-vis that of the well material ($\Delta X$ in vol %/° C.), and wherein this product $\Delta T \cdot \Delta X$ is in the range of from about 0.5 to about 10.

4. The method of claim 1, wherein the well is cooled by circulation or injection of a cold fluid.

5. The method of claim 4, wherein the well is cooled via a workstring during a drilling/completion operation, or via the completion tubing or coiled tubing for an already completed well.

6. The method of claim 4, wherein the well is cooled with the group consisting of: water, sea water, completion brine, hydrocarbons as e.g. diesel, condensate or a drilling fluid, or by slurrying of dry ice in the injection stream or cooling this stream at the surface with liquid nitrogen in a fluid/fluid heat exchanger.

7. The method of claim 1, wherein a resin is used selected from one or more of the following group consisting of: phenolic condensation resins; epoxy resin compositions, in particular based on diglycidyl ethers of bisphenols; ureum, phenol and melamine formaldehyde resins; latex compositions; room temperature vulcanizing silicone and fluorsilicone compounds and perfluoroether silicone hybrids.

8. The method of claim 1, wherein the resin has a thermal expansion coefficient that is greater than about 0.001 vol %/° C.

9. The method of claim 1, wherein the resin is a vulcanizable rubber, selected from the following group consisting of: natural rubbers, cis-polyisoprene rubber, nitrile-rubber, ethylene-propylene rubber, styrene butadiene rubber, butyl rubber, neoprene rubber, silicone rubbers, an room temperature vulcanizing silicone rubber and/or a fluor-containing room temperature vulcanizing silicone rubber.

10. The method of claim 9, where a hybrid of the rubbers plus conventional oil well cement (selected from ordinary portland cement, blast furnace slag or aluminate) is used.

11. The method of claim 1, wherein a cement pre-flush and/or after-flush is used.

12. The method of claim 11, where in a plug and abandonment operation, the cement after-flush, if any, has a higher density than the resin, and/or wherein the cement after-flush, if any, has a lower density than the resin.

13. A method for removing a seal, plug or connection made of an expanded resin according to claim 1, further comprising cooling the well wherein the seal, plug or connection is used until the seal, plug or connection has shrunk loose, and removing the loose seal, plug or connection.

14. A method of analyzing the setting time, elastic properties, shrinkage/expansion, compressibility or coefficient of thermal expansion of thermosetting resins or oil well cements under simulated reservoir pressure and temperature conditions, which comprises:

introducing a sample of a thermosetting resin or oil well cement into a pressure vessel that is equipped with a means to provide the pressure and register the volume change and that can accurately mimic realistic oil field conditions;

at least partly immersing a body in the sample;

filling the remaining volume of the vessel;

exciting the body by an external outside force; and monitoring the progress of the setting reaction on a continuous basis by a frequency/vibration) measurement, which encompasses the determination of the changing resonance frequency of the body that is at least partly immersed in the sample and which is excited by the external outside force.

15. The method of claim 14, wherein the sample is introduced into a non magnetic high pressure, high temperature pressure vessel, that is equipped with a pump capable of maintaining constant pressure by moving a piston; the body that is at least partly immersed is a flat spring; and wherein the external outside force that is used to excite the body is an external magnetic field.

16. An analyzer for analyzing the setting time, elastic properties, shrinkage/expansion, compressibility or coefficient of thermal expansion of thermosetting resins or oil well cements under simulated reservoir pressure and temperature conditions by the method as claimed in claim 14.

* * * * *